(12) United States Patent
Turzinski et al.

(10) Patent No.: US 11,035,545 B1
(45) Date of Patent: Jun. 15, 2021

(54) LIGHT BAR SYSTEM FOR MOUNTING TO A VEHICLE

(71) Applicant: Tyri International, Inc., Stevens Point, WI (US)

(72) Inventors: Kenneth Turzinski, Plover, WI (US); Todd Kramer, Hull, WI (US)

(73) Assignee: Tyri International, Inc., Stevens Point, WI (US)

( * ) Notice: Subject to any disclaimer, the term of this patent is extended or adjusted under 35 U.S.C. 154(b) by 0 days.

(21) Appl. No.: 16/924,824

(22) Filed: Jul. 9, 2020

Related U.S. Application Data

(60) Provisional application No. 62/873,569, filed on Jul. 12, 2019.

(51) Int. Cl.
| | |
|---|---|
| *F21S 43/14* | (2018.01) |
| *B60Q 1/26* | (2006.01) |
| *F21S 43/20* | (2018.01) |
| *F21V 29/76* | (2015.01) |
| *F21V 19/00* | (2006.01) |
| *F21Y 115/10* | (2016.01) |

(52) U.S. Cl.
CPC .......... *F21S 43/14* (2018.01); *B60Q 1/2696* (2013.01); *F21S 43/26* (2018.01); *F21V 19/0055* (2013.01); *F21V 29/763* (2015.01); *F21Y 2115/10* (2016.08)

(58) Field of Classification Search
CPC ......... F21S 43/14; F21S 43/26; F21V 29/763; F21V 19/055; B60Q 1/2696
USPC ....................................................... 362/459
See application file for complete search history.

(56) References Cited

U.S. PATENT DOCUMENTS

| | | | | |
|---|---|---|---|---|
| 3,590,236 | A * | 6/1971 | Ussery ................... | B60Q 1/305 362/486 |
| 5,845,983 | A * | 12/1998 | Schmidt ............... | B60Q 1/0483 362/523 |
| 6,457,734 | B1 * | 10/2002 | Hansen .................. | B60D 1/075 280/481 |
| 6,561,686 | B1 * | 5/2003 | Neubauer ................ | B60Q 1/56 362/249.01 |
| 9,849,825 | B2 * | 12/2017 | Salami, Jr. ............ | B60Q 1/0035 |
| 10,493,905 | B2 * | 12/2019 | Wilkins .................... | B60Q 1/30 |
| 2012/0026718 | A1 * | 2/2012 | Meyer .................. | B60Q 1/2696 362/35 |
| 2015/0021937 | A1 * | 1/2015 | Perez ................... | B60Q 1/2661 293/115 |
| 2017/0120805 | A1 * | 5/2017 | Marchese ................ | B60Q 1/24 |
| 2018/0257542 | A1 * | 9/2018 | Baker ..................... | F21S 45/49 |

(Continued)

FOREIGN PATENT DOCUMENTS

EP          1813476         8/2007

*Primary Examiner* — Bryon T Gyllstrom
(74) *Attorney, Agent, or Firm* — Boyle Fredrickson, S.C.

(57) ABSTRACT

A light bar system for mounting to a vehicle includes a housing defining a cavity, a light generator system within the housing cavity, and a cover over the cavity, including a lens and a bezel. The housing defines first and second ends, and a mounting arrangement secures the housing to the vehicle. The mounting arrangement may be in the form of a pair of mounting bars that extend between the vehicle and the first and second ends of the housing; a pair of brackets the connect between the vehicle and the first and second ends of the housing; or a pair of fasteners that extend through passages in the housing for engagement with the vehicle.

17 Claims, 17 Drawing Sheets

(56) References Cited

U.S. PATENT DOCUMENTS

| | | | |
|---|---|---|---|
| 2019/0126809 A1* | 5/2019 | Wymore | B60R 19/50 |
| 2019/0202346 A1* | 7/2019 | Shipman | F21K 9/64 |
| 2020/0198529 A1* | 6/2020 | Shipman | G02B 5/208 |

* cited by examiner

LIGHT BAR SYSTEM FOR MOUNTING TO A VEHICLE

CROSS-REFERENCE TO RELATED APPLICATION

This application claims the benefit of U.S. provisional patent application Ser. No. 62/873,569 filed Jul. 12, 2019, the entire disclosure of which is hereby incorporated by reference.

BACKGROUND AND SUMMARY

The present invention is directed to a light bar system for mounting to a vehicle.

The light bar system of the present invention may be in the form of a lighting arrangement configured within a guard assembly that may be positioned away from the vehicle when mounted so as to protect a given area of the vehicle from scratches and/or damage while also providing illumination. In one aspect, the lighting arrangement may include one or more light engines comprising Printed Circuit Boards (PCB's) having one or more Light Emitting Diodes (LED's) mounted thereon, an optical element disposed over each LED, and/or a translucent lens or light cover disposed over the optical element. The lighting arrangement can be rigidly supported by an interior frame mounted within the guard assembly. The guard assembly may include a rear housing receiving the lighting arrangement and a front bezel or housing cover for securely containing the lighting arrangement within the rear housing. The lens or light cover of the lighting arrangement can project through an interior opening of the bezel or housing cover so as to provide unobstructed illumination. The guard assembly may also include a heat sink mounted to or forming a part of the rear housing so as to cool the lighting arrangement. In one aspect, the guard assembly can be advantageously positioned away from the vehicle by opposing tubular side mounts attaching to the guard assembly on opposing sides. The tubular side mounts may each be curved so as to mount to the vehicle a distance away from the guard assembly out of plane. Electrical wiring can be routed through one or both of the tubular side mounts, connecting to the one or more PCB's, for powering and/or otherwise controlling the lighting arrangement, or an electrical connector may be mounted to the rear housing for supplying power to the circuit board from the electrical system of the vehicle. The guard assembly may alternatively be secured to the vehicle using one or more mounting brackets, or may be fastened directly to the vehicle using fasteners such as bolts that extend through passages defined by the rear housing of the guard assembly.

Specifically, then, one aspect of the present invention may include a light bar system for mounting to a vehicle, including: a guard assembly including a housing; a lighting arrangement configured within the housing; and first and second tubular side mounts attached to opposing sides of the guard assembly, each tubular side mount being configured to mount to a vehicle. The first and second tubular side mounts can be curved so as to position the guard assembly a distance away from the vehicle.

Another aspect of the present invention may provide a method for protecting a given area of a vehicle while providing illumination, including: providing a guard assembly including a housing; configuring a lighting arrangement within the housing; and attaching first and second tubular side mounts to opposing sides of the guard assembly, each tubular side mount being configured to mount to a vehicle.

The first and second tubular side mounts can be curved so as to position the guard assembly a distance away from the vehicle.

Another aspect of the invention may provide a method for protecting a given area of a vehicle while providing illumination, including: providing a guard assembly including a housing; configuring a lighting arrangement within the housing; and securing the guard assembly to the vehicle by one of: attaching first and second tubular side mounts to opposing sides of the guard assembly, each tubular side mount being configured to mount to a vehicle; or attaching the guard assembly to the vehicle using one or more brackets configured for interconnection between the guard assembly and the vehicle; or attaching the guard assembly directly to the vehicle using one or more fasteners that extend through one or more openings defined by the guard assembly for engagement with the vehicle.

Other aspects, features and advantages of the invention will become apparent to those skilled in the art from the following detailed description and accompanying drawings. It should be understood, however, that the detailed description and specific examples, while indicating, certain embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements can be several views, and in which.

Figure 1:
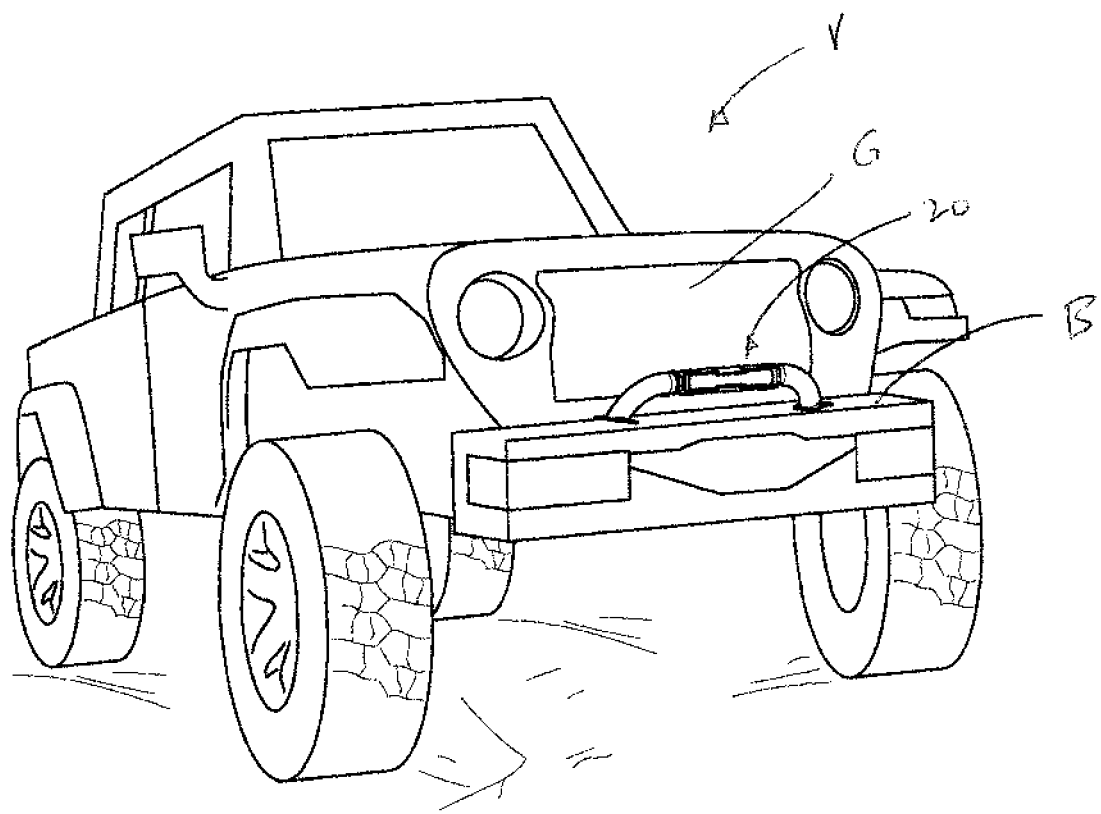
FIG. 1 is an isometric view of a light bar system in accordance with the present invention mounted to a vehicle.
Figure 2:
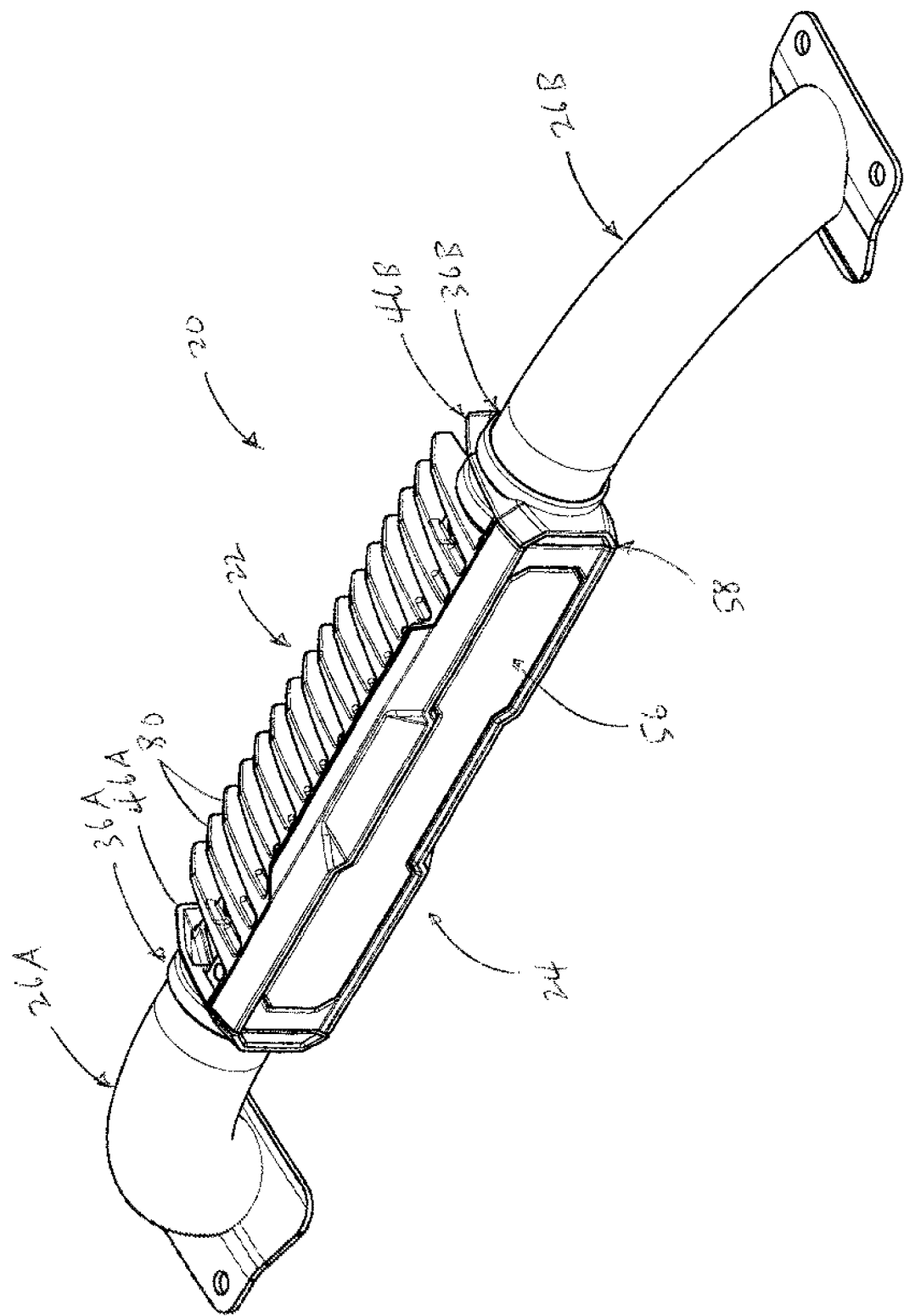
FIG. 2 is a front isometric view of the light bar system of FIG. 1.
Figure 3:
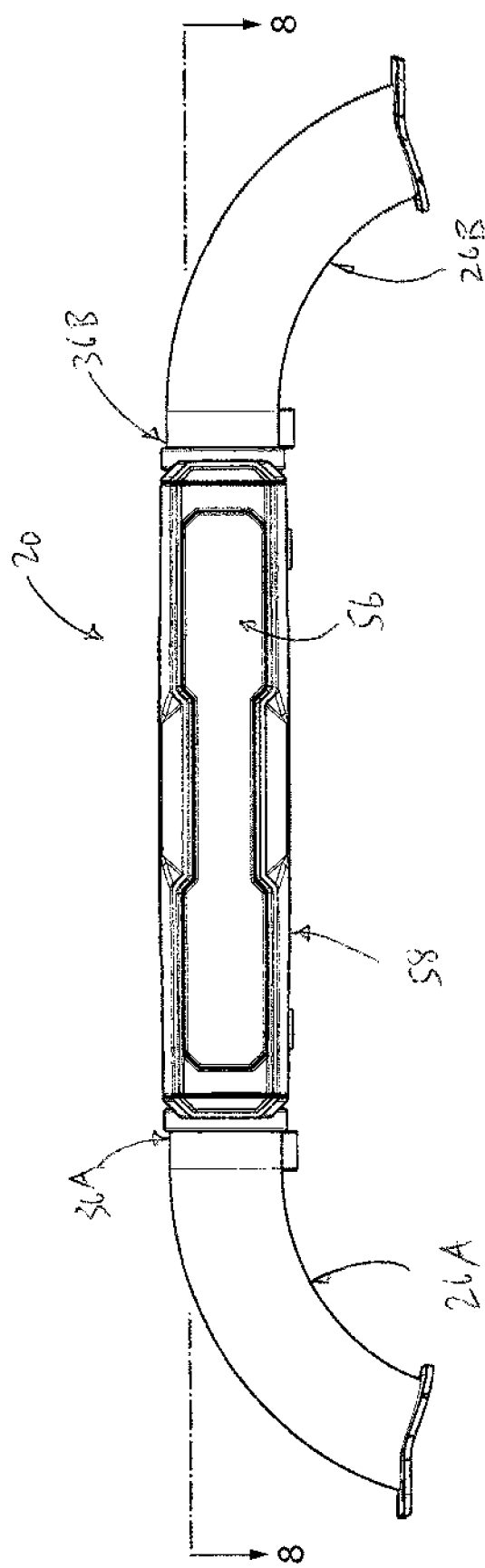
FIG. 3 is a front elevation view of the light bar system of FIGS. 1 and 2.
Figure 4:
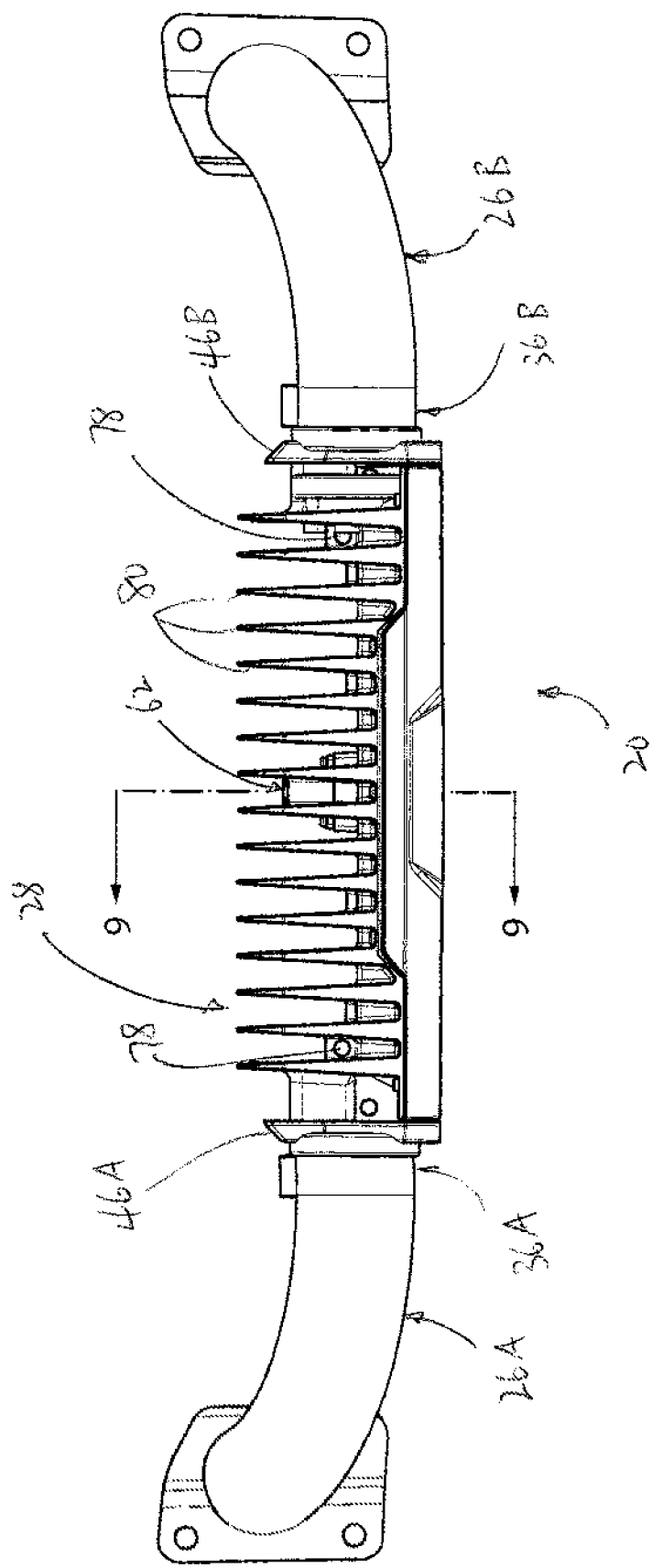
FIG. 4 is a top plan view of the light bar system of FIGS. 1-3.
Figure 5:
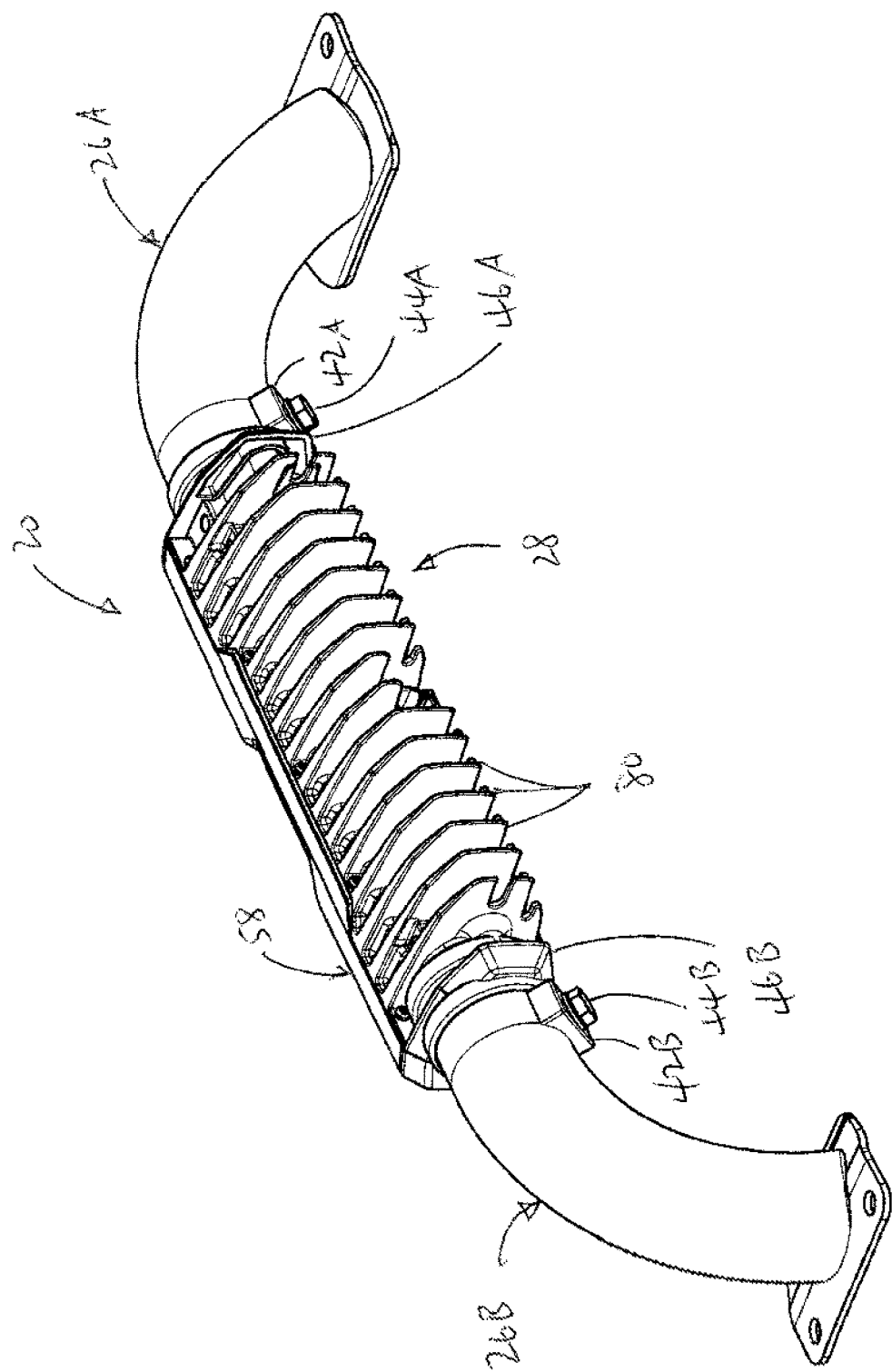
FIG. 5 is a rear isometric view of the light bar system of FIGS. 1-4.
Figure 6:
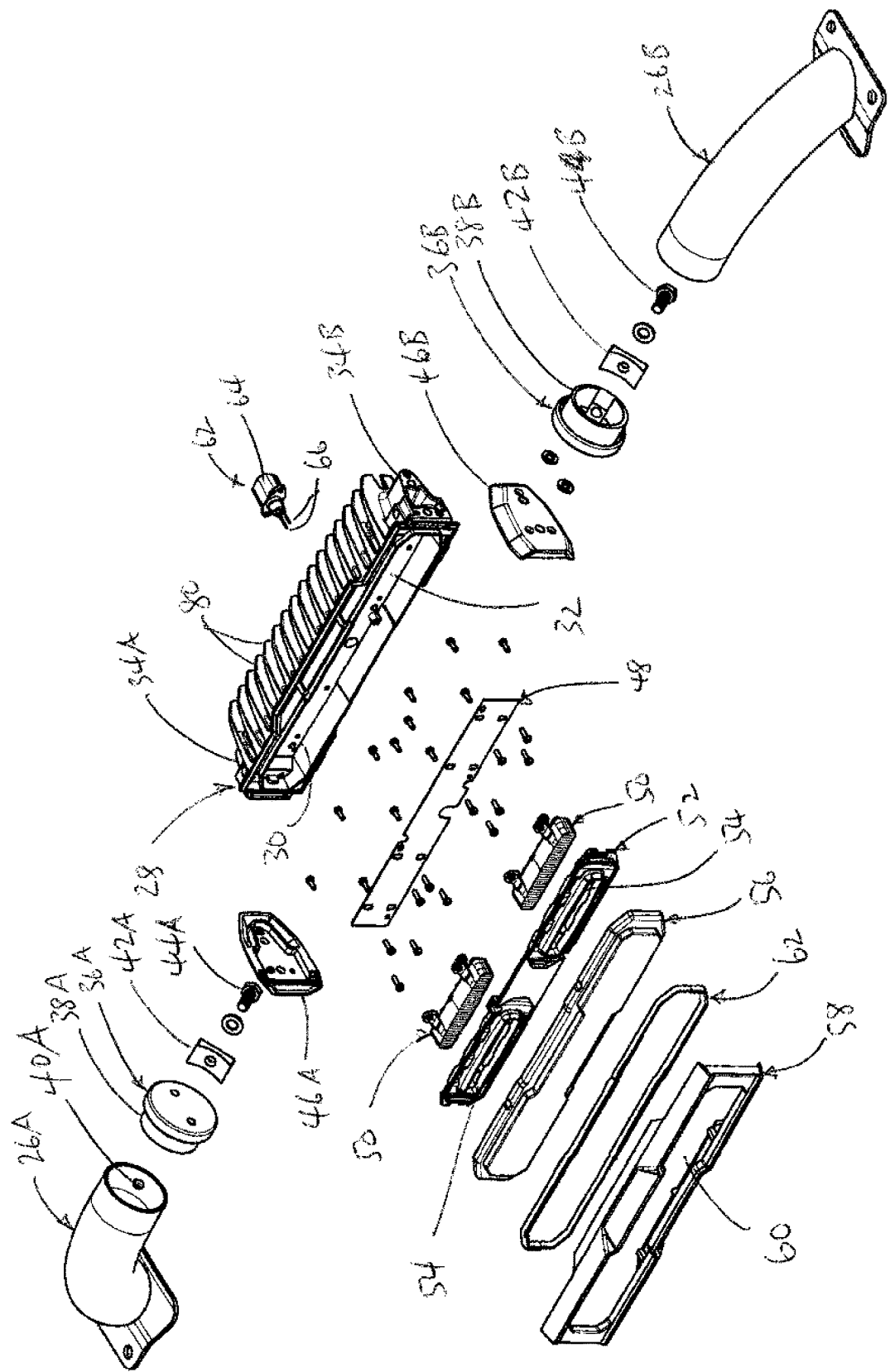
FIG. 6 is an exploded isometric view of the light bar system of FIGS. 1-5.
Figure 7:
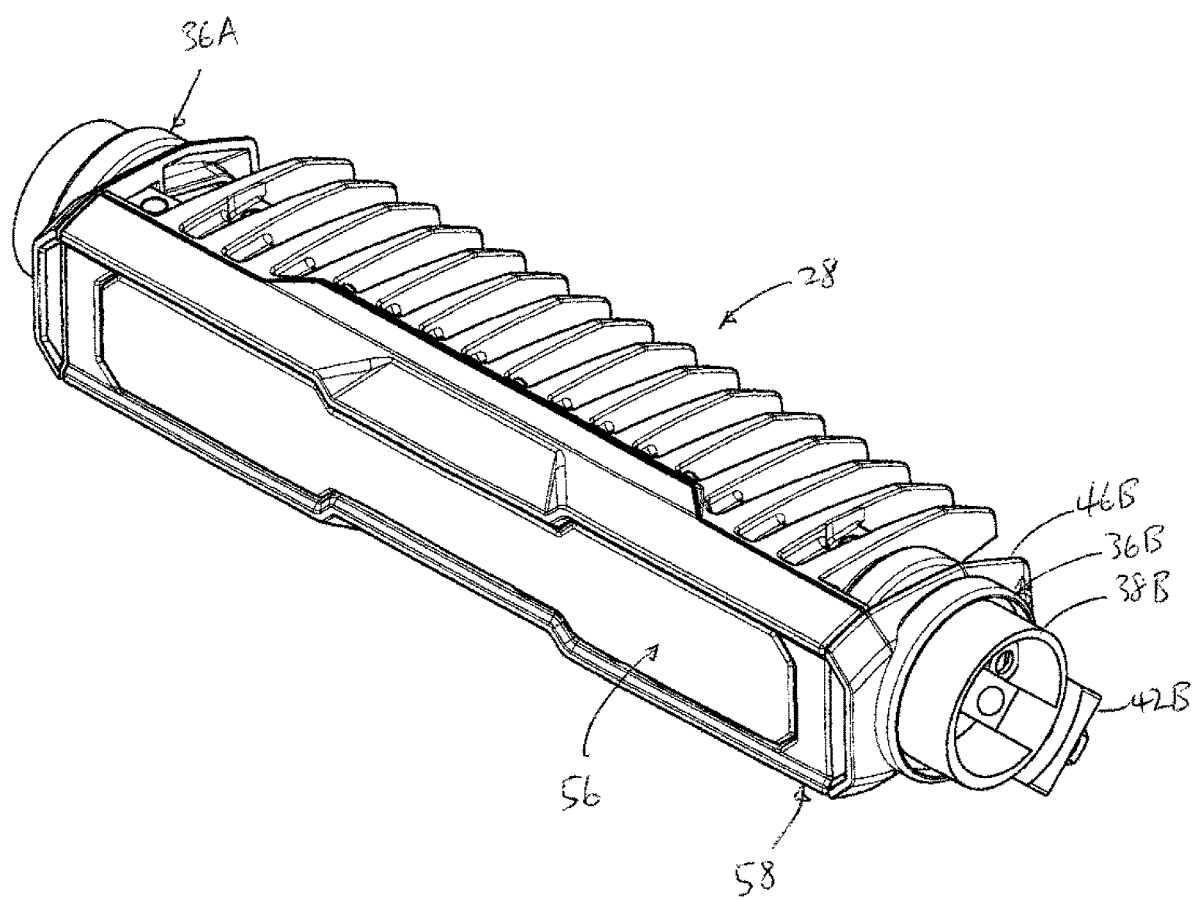
FIG. 7 is a front isometric view of the light bar system of FIGS. 1-6 with the side mounting members removed.
Figure 8:
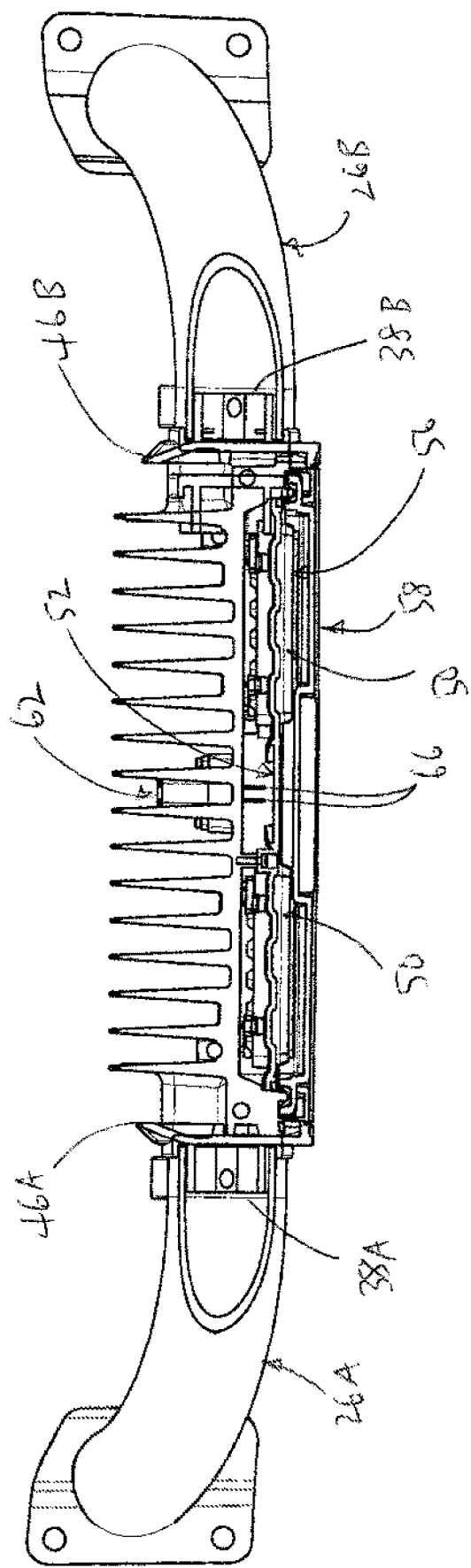
FIG. 8 is a section view taken along line 8-8 of FIG. 3.
Figure 9:
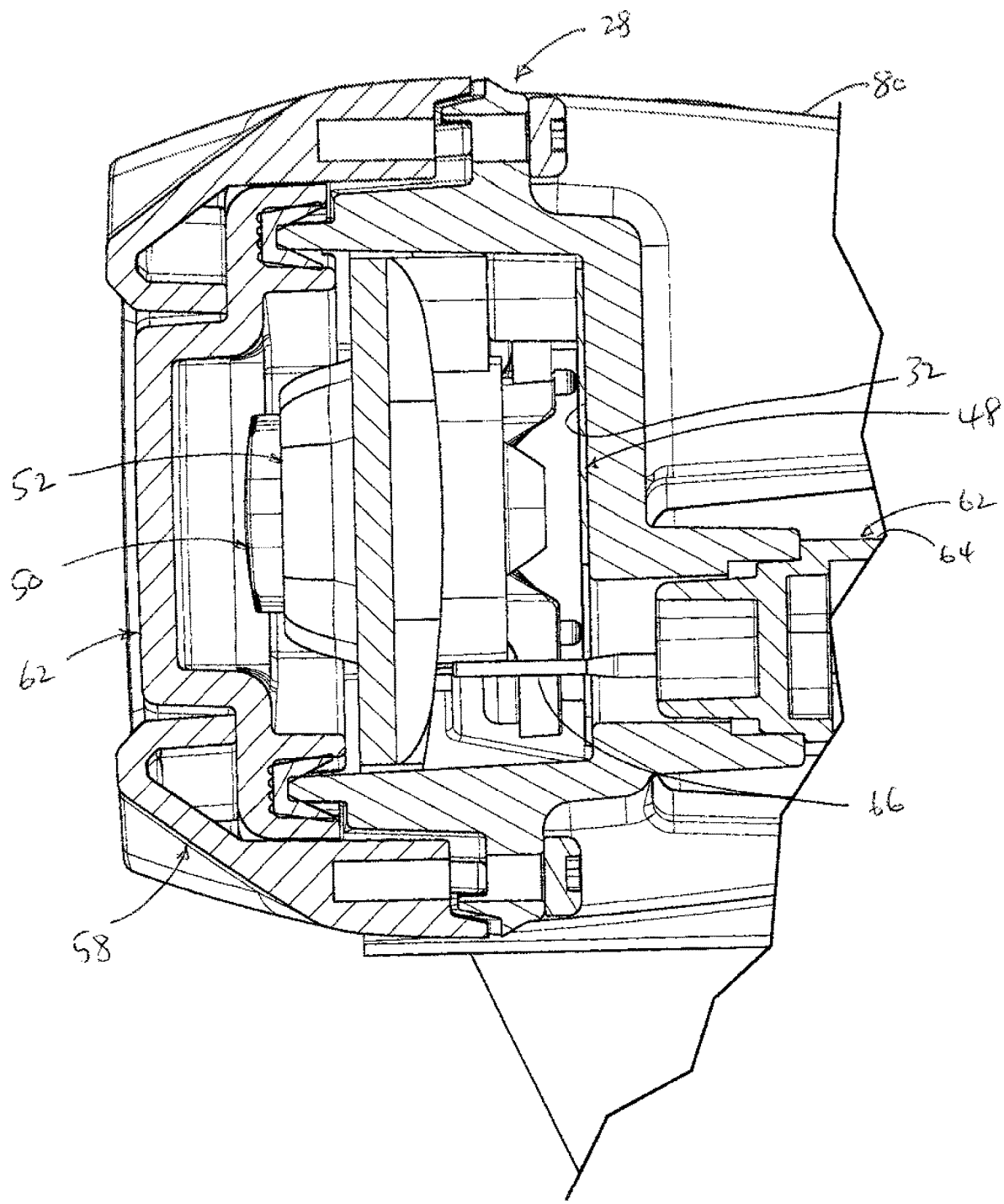
FIG. 9 is a section view taken along line 9-9 of FIG. 4.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION

The various features and advantageous details of the subject matter disclosed herein are explained more fully with reference to the non-limiting embodiments described in detail in the following description.

Referring to the following description in which like reference numerals represent like parts throughout the disclosure, FIG. 1 illustrates a first embodiment of a guard assembly in the form of a light bar system 20 in accordance with the present invention for mounting to a vehicle V. In the illustrated embodiment, the light bar system 20 may be mounted to the upper surface of a bumper B of the vehicle V at the front of the front of the vehicle V. It is understood, however, that the light bar system 20 may be mounted in any location on the vehicle V. As will be described in greater detail herein, the light bar system 20 can be advantageously positioned so that the central light-emitting components of the light bar system 20 are located a distance away from the vehicle V, namely bumper B and the vehicle radiator as illustrated, when mounted thereon so as to protect the area of vehicle 12 behind light bar system 20, for example, the grill, a winch, or the like, from scratches and/or damage from brush, branches and/or debris, while also providing illumination. Moreover, by placing such illumination in the light bar system 20, whistling/noise due to passing wind can be greatly reduced as well, in comparison with light systems mounted above the top of the vehicle V.

In one aspect, the light bar system 20 may be mounted to the upper side of the front bumper B of the vehicle V so that a centrally disposed guard assembly 22 of the light bar system 20 can protect a front grill G of the vehicle V. In other aspects, the light bar system 20 may be mounted to a lower side of the front bumper B, or to an upper or lower side of a rear bumper of the vehicle V, or to another area of the vehicle V, so as to protect other areas from scratches and/or damage while providing illumination.

With additional reference to FIGS. 2-9, various views of the light bar system 20 are provided in accordance with an aspect of the invention. The light bar system 20 can include the guard assembly 22, a lighting arrangement 24 configured within the guard assembly 22, and first and second tubular side mounts 26A and 26B, respectively, attached to opposing sides of the guard assembly 22. Each tubular side mount may be, for example, 2.5 to 3.0 inches in diameter. The first and second tubular side mounts 26A and 26B, respectively, can attach to the opposing sides of the guard assembly, at various angles and/or lengths. Varying the angle can correspondingly result in varying the distance achieved for the guard assembly away from the vehicle. Varying the length can correspondingly result in varying the mounting footprint on the vehicle. As a result, greater fit and customization can be achieved for protection and illumination.

In one aspect, the guard assembly 22 may include a main housing 28 defining a forwardly open internal cavity 30. A rear internal wall 32 of the main housing 28 defines the rearward extent of the cavity 30.

The main housing 28 defines mounting members 34A, 34B at its ends. A cap 36A is adapted to be connected between mounting member 34A and the facing end of side mount 26A, and a cap 36B is adapted to be connected between mounting member 34B and the facing end of side mount 26B. In the illustrated embodiment, cap 36A is configured such that a mounting portion 38A is insertable into the end of side mount 26A. Similarly, cap 36B is configured such that a mounting portion 38B is insertable into the end of side mount 26B. Caps 36A and 36B maybe secured to respective side mounts 26A, 26B in any satisfactory manner. In the illustrated embodiment, each side mount 36A, 36B is provided with an opening, such as shown at 40A. The mounting portions 38A, 38B are hollow, with the wall of each mounting portion 38A, 38B having an opening in alignment with the opening such as 40A in the side mount end. Concave washers 42A, 42B are positioned against the outer surfaces of the side mounts 26A, 26B, respectively. When mounting portions 38A, 38B are received within the respective ends of side mounts 26A, 26B, the openings are aligned and the shank of one of respective set screws 44A, 44B extends through the aligned openings into engagement with a threaded opening in mounting portions 38A, 38B, respectively, in order to secure the caps 36A, 36B to the respective side mounts 26A, 26B. In an alternative arrangement, rather than the internal engagement of the caps within the open ends of the side mounts, the caps maybe provided with a mounting portion having a recess within which the side mount end is received, in combination with a suitable transverse securement arrangement such as a set screw or the like for maintaining such components in engagement with each other.

In the illustrated embodiment, a plate 46A is positioned between main housing mounting member 34A and the face of cap 36A, and likewise a plate 46B is positioned between main housing mounting number 34B and the face of cap 36B. Plates 46A, 46B may be provided with openings that are aligned with facing openings defined by the faces of respective mounting members 34A, 34B and respective caps 36A, 36B. Suitable threaded fasteners maybe employed for securing mounting member 34A, cap 36A and plate 46A together, and likewise suitable threaded fasteners may be employed for securing mounting member 348, cap 368 and plate 468 together.

A circuit board 48 is configured to be positioned within the cavity 30 of main housing 28 and secured to rear internal wall 32. Light generators, such as LED's, are secured to circuit board 48, and optical elements 50 are positioned over the LED's to control the output of light from the LED's. In one aspect, the circuit board 48 may include two or more interconnected printed circuit board assemblies arranged in series longitudinally, with each printed circuit board assembly including a number of spaced apart LED's mounted thereon. The optical elements 50 can be configured to enhance the transmission of light from the LED's, such as, for example, to refract the light from the LED's. A reflector 52 overlies circuit board 48, and has a pair of openings 54, each of which is shaped similarly to and slightly larger than one of the optical element 50, such that each optical element 50 is positioned within and extends through one of the reflector openings 54. A lens 56 is positioned outwardly of reflector 52. A bezel 58 having an opening 60 is positioned outwardly of lens 56, and a gasket 62 is positioned between lens 56 and bezel 58. The lens 56 and a bezel 58 are configured to overlie and enclose the cavity 30 of the main housing 28, with bezel 58 being secured to main housing 28 in any satisfactory manner, such as via fasteners or the like. The opening 60 of bezel 58 is shaped similarly to a portion of lens 56 through which light from optical elements 50 is emitted, with a rim of lens 56 facing an inner surface of bezel 58. Gasket 62 functions to provide a watertight seal against entry of water or other moisture into the cavity 30 of main housing 28.

A connector 62 is engaged with a connector mounting area located on the rearward area of main housing 28. Connector 62 includes a main connector body 64 and a pair of forwardly extending prongs 66. The rearward portion of the main connector body 64 of connector 62, located exteriorly of the main housing 28, is configured to be engaged by a mating connector (not shown) that is interconnected with and extends from the electrical system of vehicle V. The forward portion of main connector body 64 is positioned within a passage 68 defined by the mounting area of main housing 28, and a suitable seal or other structure is provided between the forward portion of main connector body 64 and the mounting area of main housing 28 to prevent the entry of moisture or other contaminants into passage 68. The prongs 66 of connector extend forwardly into engagement with mating openings in circuit board 48, to supply power and control signals to circuit board 28.

Main housing 28 is formed with a series of fins or vanes 80, which function as a heat sink, to dissipate to surrounding air any heat that is transferred to the main housing 28 by operation of the circuit board 48 and optical elements 50 within the cavity 30 of the main housing 28.

Figure 10:
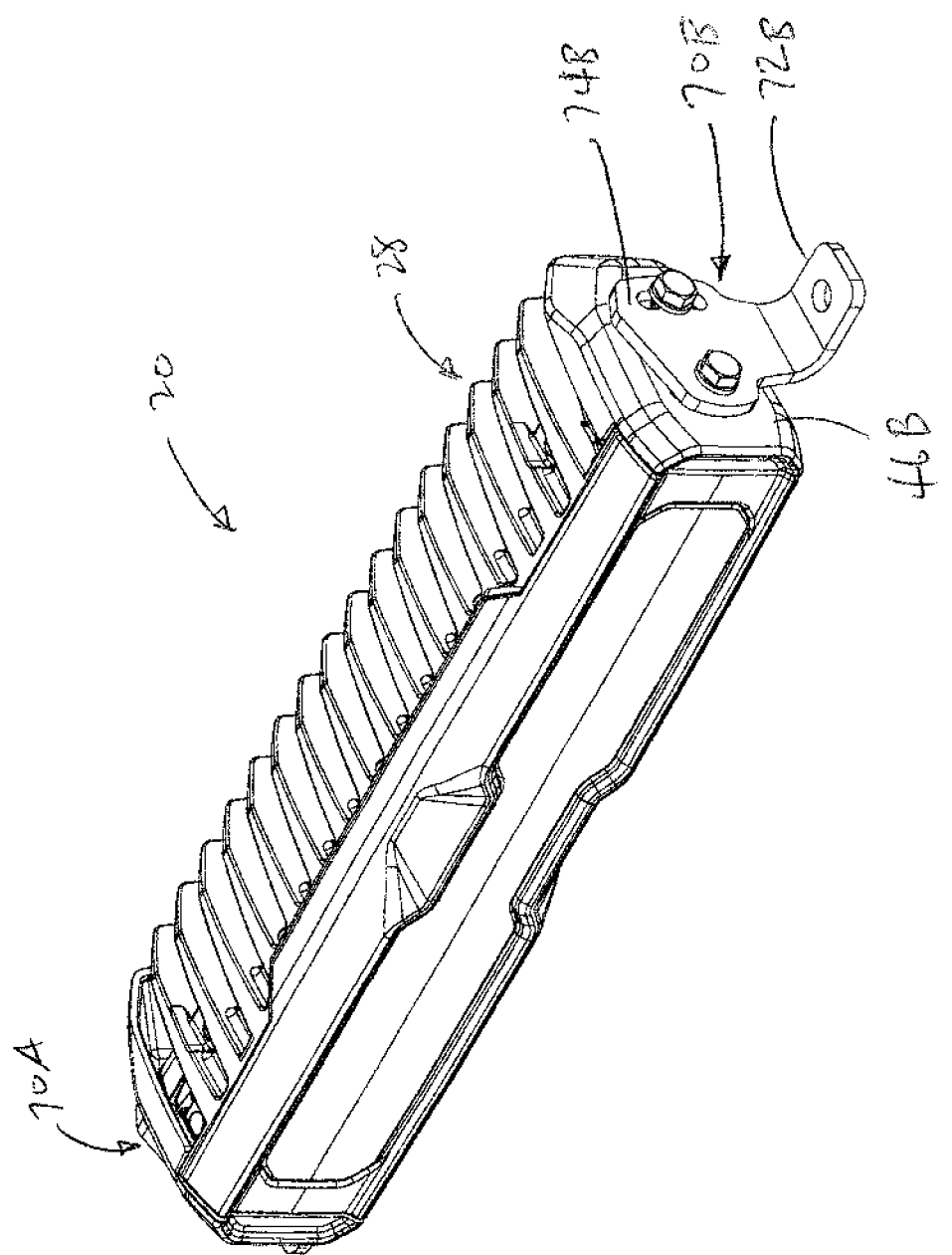
FIG. 10 is a front isometric view similar to FIG. 7, showing an alternative arrangement for mounting the guard assembly to a vehicle.
Figure 11:
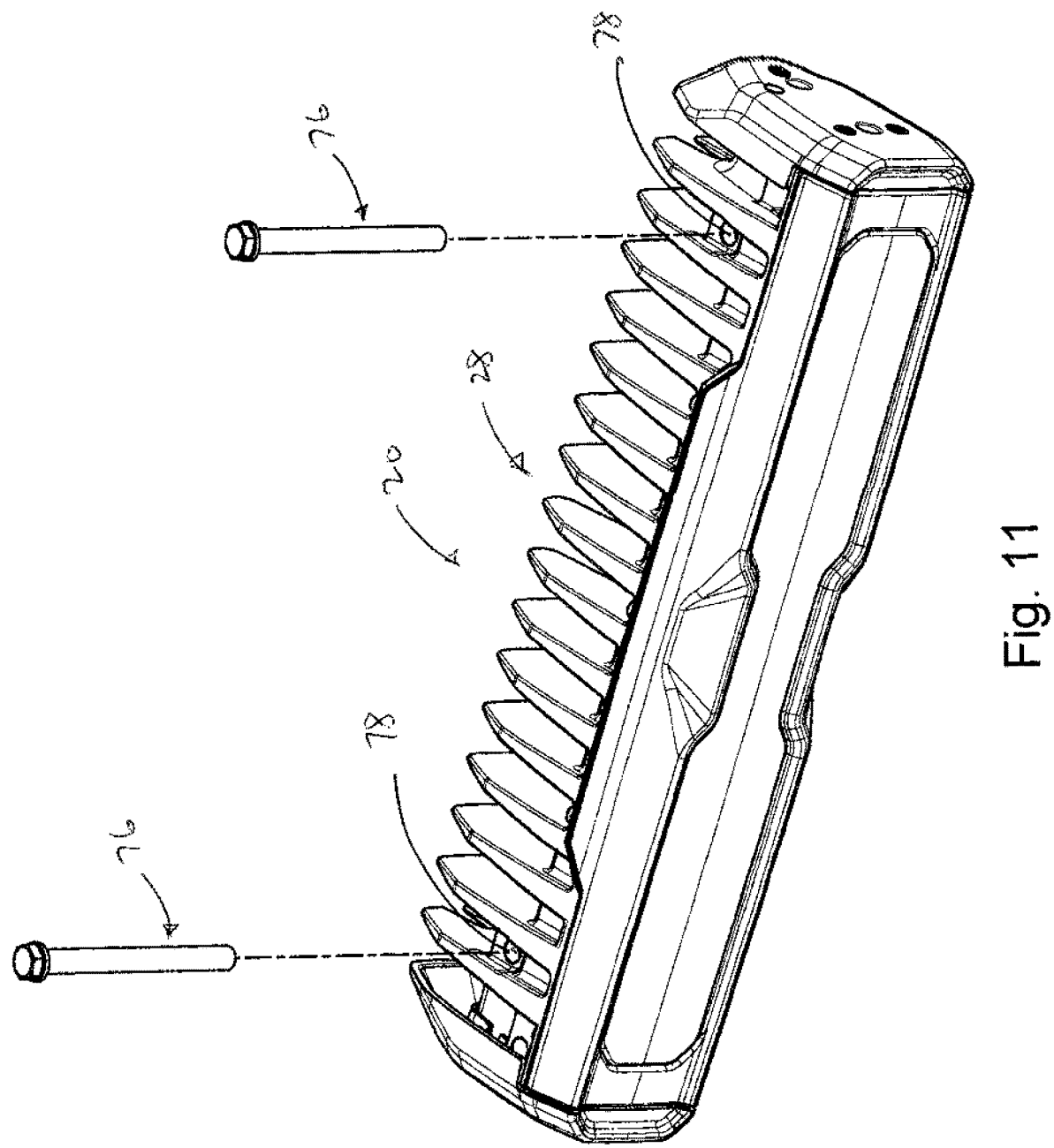
FIG. 11 is a front isometric view similar to FIGS. 7 and 10, showing yet another alternative arrangement for mounting the guard assembly to a vehicle.
Figure 12:
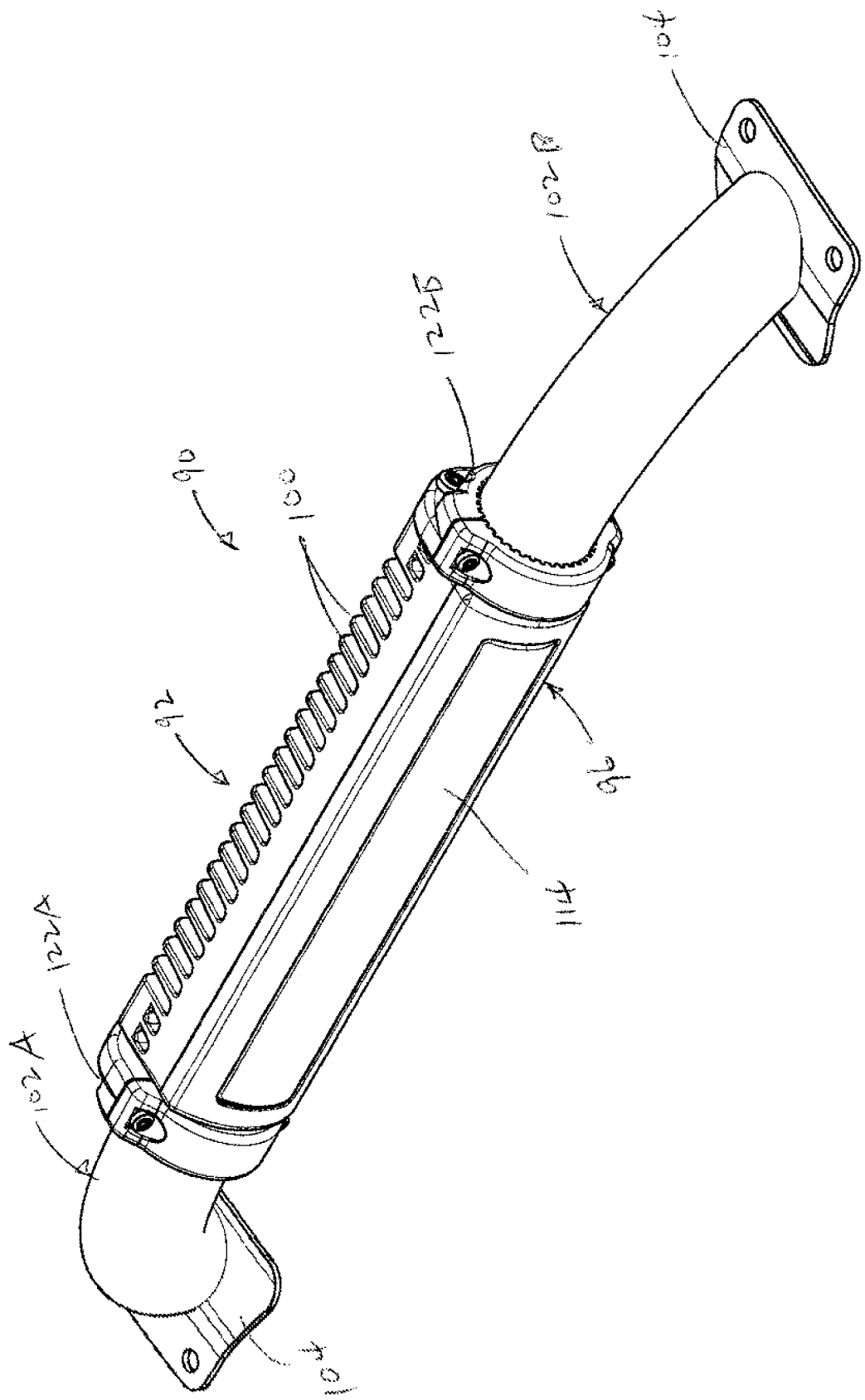
FIG. 12 is a front isometric view of another embodiment of a guard assembly for the vehicle light bar system in accordance with the present invention.
Figure 13:
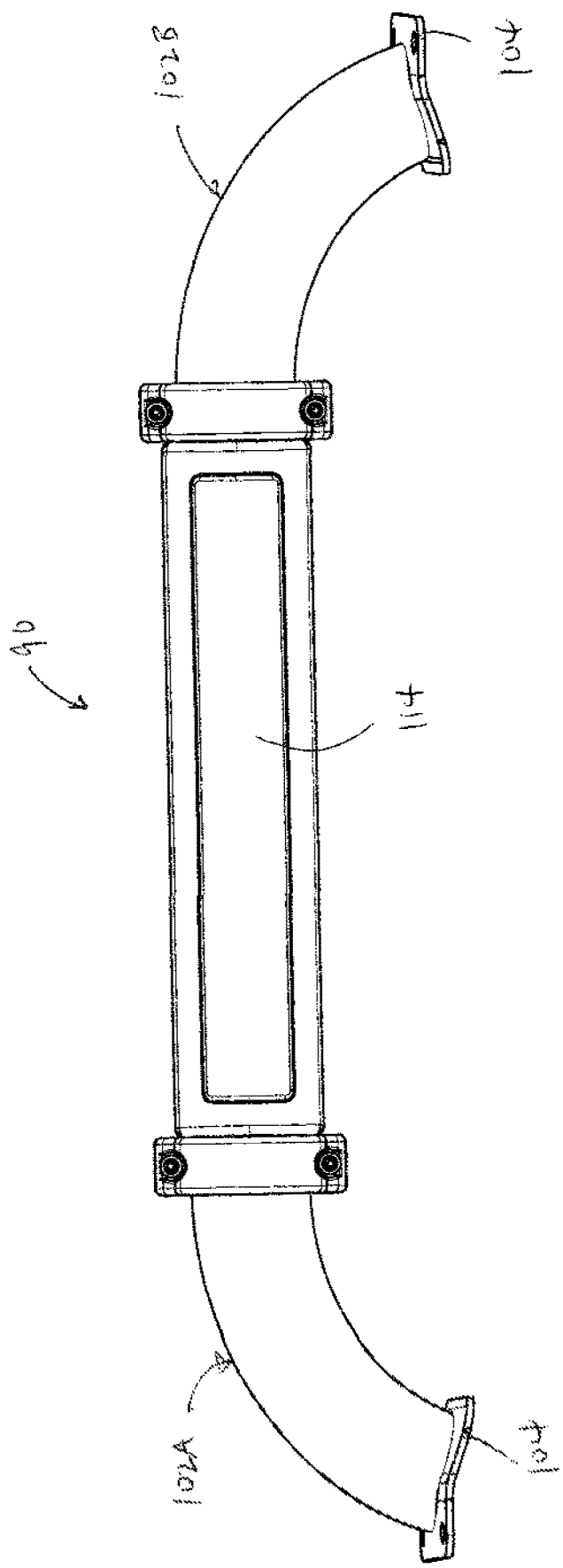
FIG. 13 is a front elevation view of the vehicle light bar system of FIG. 12.

FIGS. 10 and 11 illustrate alternative arrangements for mounting main housing 28 and its associated components to vehicle V. As shown in FIG. 10, the mounting members 34A, 34B and caps 36A, 36B may be replaced with mounting brackets 70A, 70B, respectively. As shown with respect to mounting bracket 70B, each of mounting brackets 70A, 70B may include a vehicle mounting portion such as 72A and a housing mounting portion such as 74B that extends at an angle relative to vehicle mounting portion 72A. Representatively, and in a typical application, the vehicle mounting portion such as 72A may be oriented generally horizontally and the housing mounting portion such as 74B may be oriented generally vertically. It is understood, however, that other bracket configurations may be employed as well as other planar orientations of the bracket components and angular relationships of the bracket components relative to each other. As shown in FIG. 11, main housing 28 and its associated components may also be mounted to the vehicle V using fasteners, such as a pair of threaded bolts 76, that extend through passages such as 78 formed in main housing 28. The passages 78 extend throughout the full height of the main housing 28, such that the lower end of each bolt 76 extends below the lower extent of the main housing 28 for engagement with a mating threaded receiver in or on the vehicle V.

FIGS. 12-17 illustrate another representative embodiment of a guard arrangement in the form of a light bar assembly, shown at 90, in accordance with the present invention. In this embodiment, the light bar assembly 90 includes a rear housing 92 defining a cavity 94, and a front bezel or housing cover 96, such as an aluminum bezel, with an interior opening 98 for the passage of light (see exploded view in FIG. 16), with fasteners for securely containing the lighting components within the cavity 94 of rear housing 92, The guard assembly may also include a heat sink in the form of fins 100 arranged with respect to the rear housing 92, preferably extending rearward from the housing 92, opposite of the direction of illumination, so as to cool the lighting components of light bar assembly 90. The fins 100, which may be integral with the rear housing 92 or separately mounted thereto, may comprise multiple heat dissipating fins arranged longitudinally along the rear housing 92.

Figure 14:
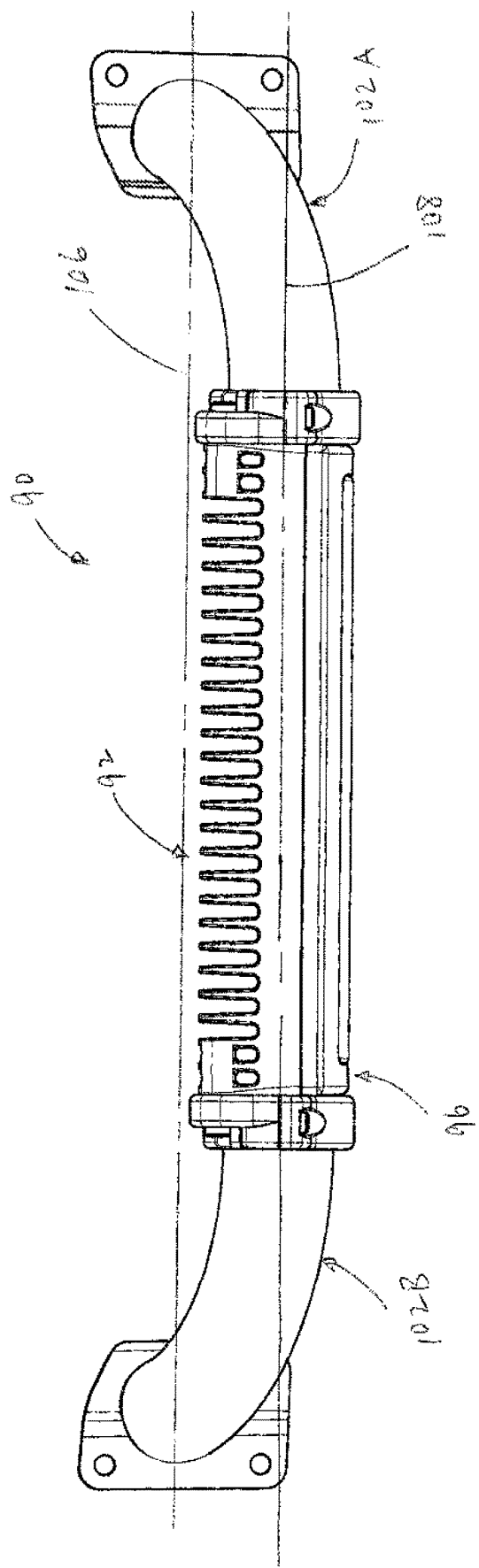
FIG. 14 is a top plan view of the vehicle light bar system of FIGS. 12 and 13.
Figure 15:
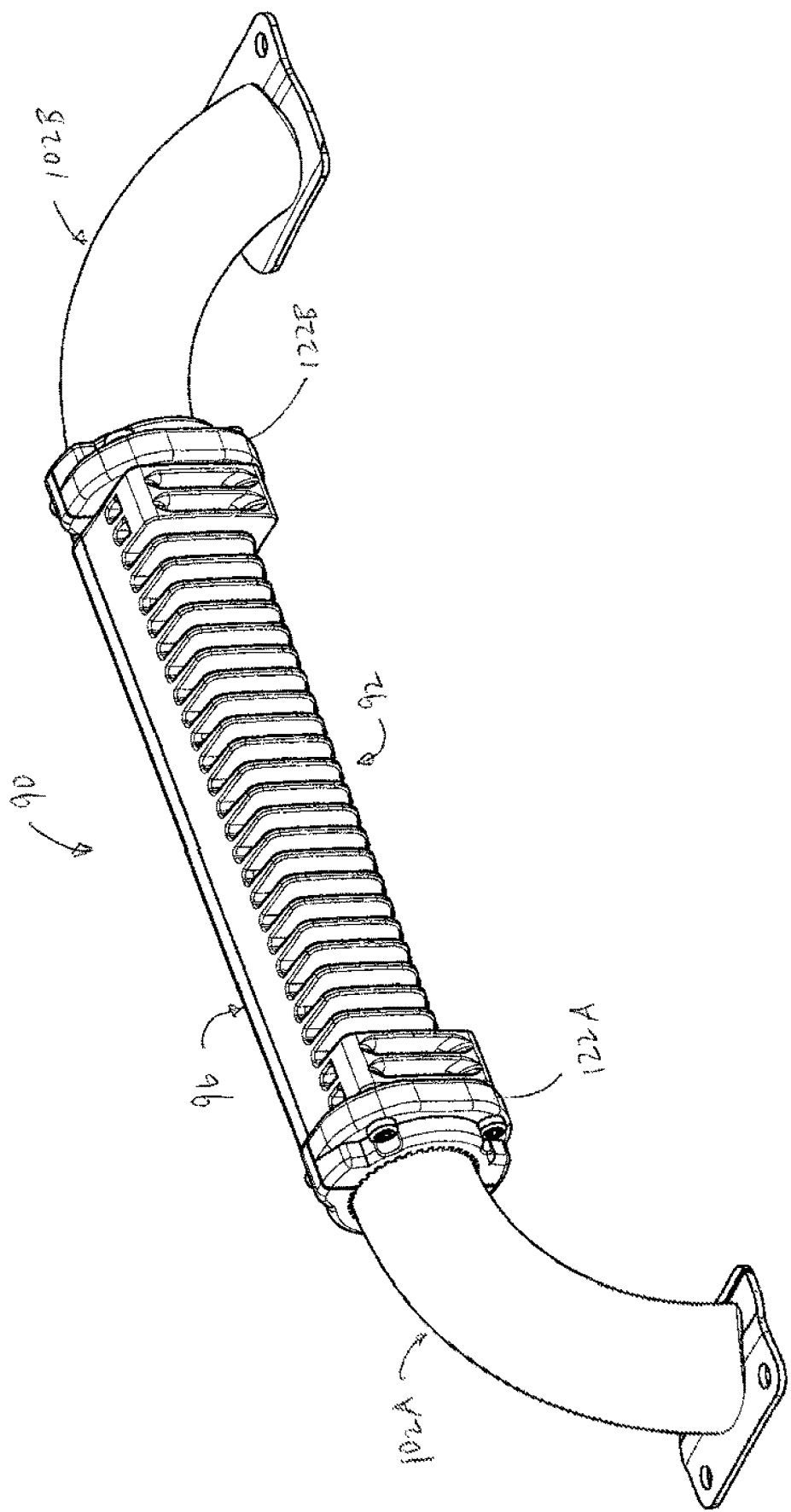
FIG. 15 is a rear isometric view of the vehicle light bar system of FIGS. 12-14.

The light bar assembly 90 may include first and second tubular side mounts 102A and 102B, respectively, which can include mount plates 104 with contours to mount to the vehicle, such as by way of fasteners through apertures. In accordance with an aspect of the invention, the first and second tubular side mounts 102A and 102B, respectively, can be curved so as to position the light bar assembly 90 a distance away from the vehicle when mounted thereto. With particular reference to FIG. 14, a top view of the light bar system 90 illustrates a first longitudinal axis 106, which may be generally aligned with the mount plates 104 for mounting to the vehicle, such as to the bumper, and a second longitudinal axis 108, in parallel to, and out of plane with, the first longitudinal axis 106, which may be generally aligned with the central portion of the guard assembly, namely rear housing 92 and bezel 96 when assembled together. Due to the configuration of the first and second tubular side mounts 102A, 102B, respectively, and more particularly, due to their curved arrangement, the guard assembly is correspondingly positioned out of plane with the first longitudinal axis 106, causing the guard assembly to b a distance away from the vehicle when mounted thereto. Accordingly, the guard assembly can be advantageously positioned away from the vehicle by the tubular side mounts. In one aspect, the guard assembly may be positioned at least 3 inches away from the nearest surface of the vehicle V.

Figure 16:
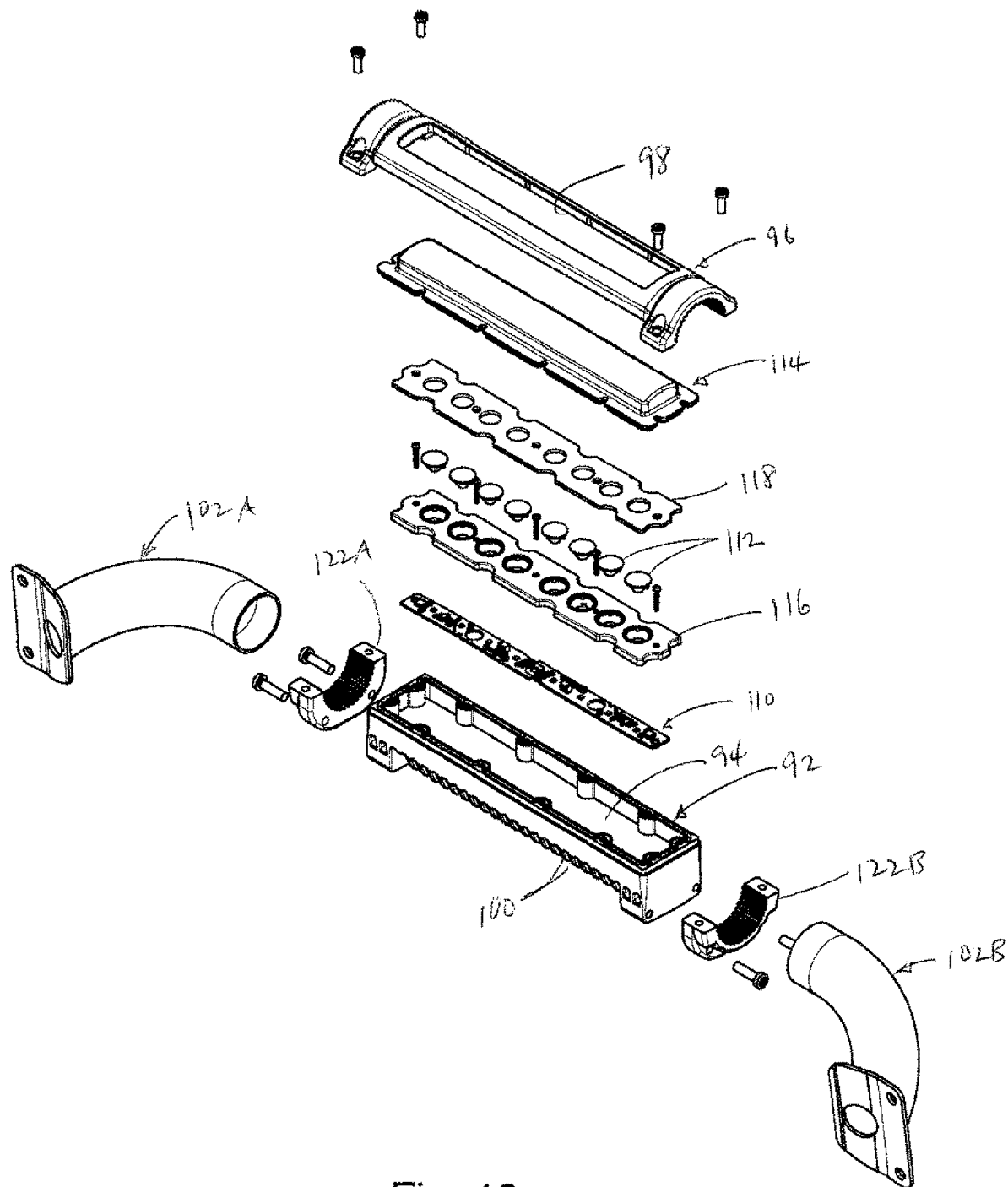
FIG. 16 is an exploded isometric view of the vehicle light bar system of FIGS. 12-15.
Figure 17:
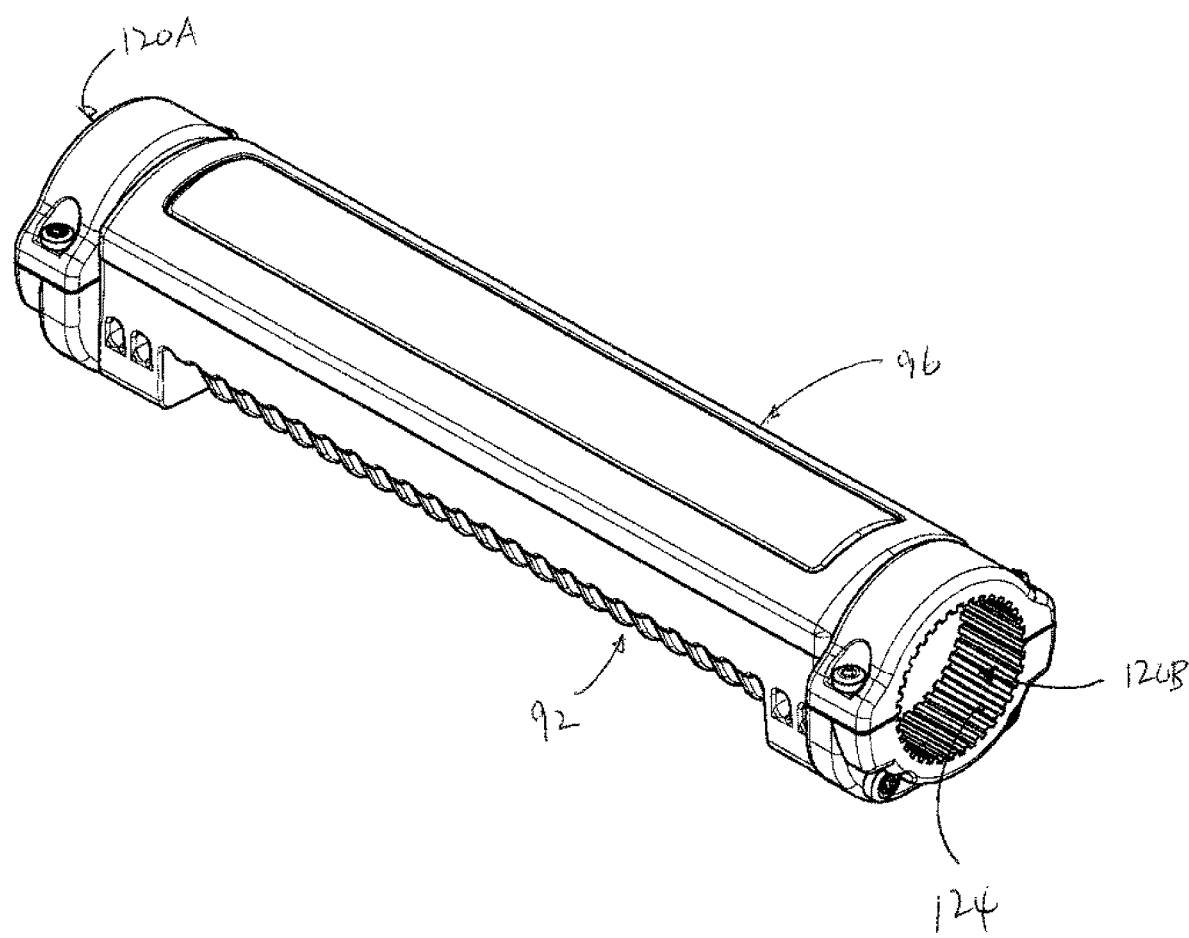
FIG. 17 is a front isometric view of the vehicle light bar system of FIGS. 12-16 with the side mounting members removed.

With additional reference to FIG. 16, an exploded view of the light bar system 90 is provided in accordance with an aspect of the invention. As may best be seen in this view, in one aspect, the lighting arrangement configured within the guard assembly may include one or more light engines comprising Printed Circuit Boards (PCB's) 110, each having one or more Light Emitting Diodes (LED's) mounted thereon, an optical element or lens 112 disposed over each LED, and/or a translucent lens or light cover 114, such as a polycarbonate lens, disposed over the optical elements 112. In one aspect, the light bar system 90 may include two PCB's 110, each arranged in series longitudinally along the rear housing cavity 94, with each PCB including six (6) to eight (8) LED's mounted thereon. It is understood, however, that any satisfactory number of PCB's may be employed. The optical elements 112 can be configured to enhance the transmission of light from the LED's, such as to refract the light from the LED's. The lighting arrangement, and particularly the PCB's 110 and the optical elements 112, can be rigidly supported by an interior frame 116 mounted within the guard assembly by fasteners. A gasket 118, disposed between the interior frame 116 and the lens or light cover 114, and surrounding the optical elements 112, can provide ingress protection, particularly with respect to water intrusion. The lens or light cover 114 can project through the interior opening 98 of the bezel or housing cover 96 so as to provide unobstructed illumination. In addition, the bezel or housing cover 96 can extend beyond the lens or light cover 114 so as to protect the lighting arrangement. Electrical wiring, such as power and ground wires, can be routed through one or both of the first and second tubular side mounts 102A and 102B, respectively, connecting to one or more of the PCB's 110, for powering and/or otherwise controlling the LED's and the lighting arrangement.

In addition, and as noted previously, the first and second tubular side mounts 102A and 102B, respectively, can attach to the opposing sides of the guard assembly consisting of the assembled rear housing 92, bezel 94 and associated components, at various angles and/or lengths. Varying the angle can correspondingly result in varying the distance achieved for the guard assembly away from the vehicle. Varying the length can correspondingly result in varying the mounting footprint on the vehicle along the first longitudinal axis 106 (see FIG. 14). As a result, greater fit and customization can be achieved for protection and illumination. With additional reference to FIG. 16, in one aspect, the first and second tubular side mounts 102A and 102B can be positioned within openings 120A and 120B (FIG. 17), respectively, in sides of the guard assembly defined by the connected rear housing 92 and bezel 96, each at the desired angle and/or length. Then, first and second collars 122A and 122B, respectively, and fasteners can be used to securely lock the aforementioned tubular side mounts 102A, 102B to the guard assembly, such as by clamping around the tubular side mounts and tightening. Ridges or teeth 124, interior to the first and second collars 120A, 120B can grip the tubular side mounts 102A, 102B during tightening to maintain a strong hold at multiple points circumferentially around the first and second tubular side mounts 102A, 102B, respectively. In other aspects, the first and second collars 122A, 122B, respectively, may be attached by flanges and/or welding on the guard assembly.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

Various additions, modifications, and rearrangements are contemplated as being within the scope of the following claims, which particularly point out and distinctly claim the subject matter regarding as the invention, and it is intended that the following claims cover all such additions, modifications, and rearrangements.

What is claimed is:

1. A light bar system for mounting to a vehicle, comprising:
   a guard assembly comprising a housing, wherein the housing defines first and second ends and a pair of interior mounting areas spaced inwardly from the first and second ends;
   a lighting arrangement configured within the housing;
   first and second side mounts configured for attachment to the first and second ends, respectively, of the housing, the first and second side mounts being configured to mount to the first and second ends, respectively, of the housing and to a vehicle in a first mounting configuration of the guard assembly to the vehicle, wherein the first and second side mounts are configured to space the guard assembly a distance away from the vehicle in the first mounting configuration; and
   a pair of securement members configured for engagement with the pair of interior mounting areas of the housing and with the vehicle in a second mounting configuration of the guard assembly to the vehicle without the first and second side mounts, wherein in the second mounting configuration the housing is not spaced from the vehicle and is positioned against the vehicle.

2. The light bar system of claim 1, wherein the lighting arrangement comprises a Printed Circuit Board (PCB) having one or more Light Emitting Diodes (LED's) mounted thereon.

3. The light bar system of claim 2, wherein the lighting arrangement further comprises an optical element disposed over each LED for controlling the output of light therefrom.

4. The light bar system of claim 3, wherein the lighting arrangement further comprises a translucent lens or light cover disposed over the optical element.

5. The light bar system of claim 4, wherein the guard assembly further comprises a heat sink associated with the housing, wherein the translucent lens or light cover is arranged outwardly from the guard assembly in a first direction and the heat sink is arranged outwardly from the guard assembly in a second direction opposite to the first direction.

6. The light bar system of claim 1, further comprising first and second collars, wherein the first and second side mounts are configured for attachment to the guard assembly via the first and second collars, respectively.

7. A method for protecting a given area of a vehicle while providing illumination, comprising:
   providing a guard assembly comprising a housing, wherein the housing defines first and second ends and a pair of interior mounting areas spaced inwardly from the first and second ends;
   configuring a lighting arrangement within the housing;
   providing first and second side mounts, the first and second side mounts being configured for attachment to the first and second ends, respectively, of the housing and for engagement with the vehicle in a first mounting configuration of the guard assembly to the vehicle, wherein in the first mounting configuration the first and second side mounts are configured to space the guard assembly a distance away from the vehicle;
   providing a pair of securement members configured for engagement with the pair of interior mounting areas of the housing and with the vehicle in a second mounting configuration of the guard assembly to the vehicle, wherein in the second mounting configuration the housing is not spaced from the vehicle and is positioned against the vehicle; and
   securing the guard assembly to the vehicle in either the first mounting configuration using the first and second mounts or in the second mounting configuration using the pair of securement members.

8. The method of claim 7, wherein the first and second side mounts comprise first and second tubular side mounts.

9. The method of claim 8, wherein each tubular side mount is adapted to be positioned between an end defined by the housing and a surface of the vehicle.

10. The method of claim 7, wherein the first and second side mounts comprise first and second brackets, wherein each bracket is adapted to be positioned between an end defined by the housing and a surface of the vehicle.

11. The method of claim 7, wherein the pair of securement members comprises a pair of fasteners, wherein each fastener is adapted to extend through an opening defined by one of the interior mounting areas of the housing for engagement with the vehicle.

12. A light bar system for a vehicle, comprising:
- a housing defining a cavity wherein the housing defines first and second ends and a pair of interior mounting areas spaced inwardly from the first and second ends;
- a light generating arrangement within the cavity of the housing;
- a cover arrangement positioned over the light generating arrangement for enclosing the light generating arrangement and for allowing light therefrom to be emitted from the cavity of the housing; and
- a mounting arrangement for securing the housing to the vehicle;
- wherein in a first mounting configuration of the guard assembly to the vehicle the mounting arrangement comprises first and second side mounts configured for attachment to the first and second ends, respectively, of the housing and to the vehicle, wherein the first and second side mounts are configured to space the guard assembly a distance away from the vehicle in the first mounting configuration; and
- wherein in a second mounting configuration of the guard assembly to the vehicle the mounting arrangement comprises a pair of securement members configured for engagement with the pair of interior mounting areas of the housing and with the vehicle, wherein in the second mounting configuration the housing is not spaced from the vehicle and is positioned against the vehicle.

13. The light bar system of claim 12, wherein the first and second side mounts comprise a pair of mounting bars, each of which is engageable at a first end with an end defined by the housing and at a second end with a surface of the vehicle.

14. The light bar system of claim 13, further comprising first and second mounting caps, wherein the first mounting cap is interconnected between a first end of a first one of the mounting bars and the first end of the housing, and wherein the second mounting cap is interconnected between a first end of a second one of the mounting bars and the second end of the housing.

15. The light bar system of claim 12, wherein the first and second side mounts comprise a pair of mounting brackets, each of which is engageable between an end defined by the housing and a surface of the vehicle.

16. The light bar system of claim 12, wherein the pair of securement members comprises a pair of fasteners, wherein each fastener is adapted to extend through a passage defined by one of the pair of interior mounting areas of the housing for engagement with the vehicle.

17. The light bar system of claim 12, wherein the light generating arrangement comprises a circuit board contained within the cavity of the housing, one or more light generating elements secured to the circuit board, and an optical element for controlling the output of light from each light generating element, and wherein the cover arrangement comprises a lens and a bezel, wherein the lens overlies the light generating elements and the bezel secures the lens to the housing over the cavity of the housing.

* * * * *